United States Patent
Dong et al.

(10) Patent No.: US 9,181,405 B2
(45) Date of Patent: Nov. 10, 2015

(54) FORMALDEHYDE-FREE LIGNIN-AMINE COAGULANTS

(75) Inventors: Hongchen Dong, Niskayuna, NY (US); Wenqing Peng, Shanghai (CN); Larry Neil Lewis, Scotia, NY (US)

(73) Assignee: General Electric Company, Schenectady, NY (US)

( * ) Notice: Subject to any disclaimer, the term of this patent is extended or adjusted under 35 U.S.C. 154(b) by 875 days.

(21) Appl. No.: 13/350,049

(22) Filed: Jan. 13, 2012

(65) Prior Publication Data

US 2013/0180927 A1 Jul. 18, 2013

(51) Int. Cl.
*C08H 7/00* (2011.01)
*C02F 1/56* (2006.01)

(52) U.S. Cl.
CPC ... *C08H 6/00* (2013.01); *C02F 1/56* (2013.01)

(58) Field of Classification Search
CPC .................................. C08H 6/00; C02F 1/56
See application file for complete search history.

(56) References Cited

U.S. PATENT DOCUMENTS

| | | | |
|---|---|---|---|
| 3,407,188 A | 10/1968 | Cavagna | |
| 3,718,639 A | 2/1973 | Falkehag et al. | |
| 3,784,493 A | 1/1974 | Giguere et al. | |
| 3,865,803 A | 2/1975 | Falkehag | |
| 3,912,706 A * | 10/1975 | Rachor et al. | 527/403 |
| 4,017,419 A | 4/1977 | Ludwig et al. | |
| 4,017,475 A | 4/1977 | Ludwig | |
| 4,155,847 A | 5/1979 | Tanaka et al. | |
| 4,455,257 A | 6/1984 | Hoftiezer et al. | |
| 4,739,040 A | 4/1988 | Naae et al. | |
| 4,775,744 A | 10/1988 | Schilling et al. | |
| 4,938,803 A | 7/1990 | Huddleston et al. | |
| 5,188,665 A | 2/1993 | Schilling | |
| 5,804,525 A | 9/1998 | Boden et al. | |
| 2004/0106684 A1 * | 6/2004 | Koyama et al. | 514/659 |
| 2013/0274150 A1 | 10/2013 | Holt et al. | |

FOREIGN PATENT DOCUMENTS

| CA | 1018519 A1 | 10/1977 |
|---|---|---|
| EP | 1992657 A1 | 11/2008 |

OTHER PUBLICATIONS

Da Cunha, C., et al., "Synthesis and polymerization of lignin-based macromonomers. III. Radical copolymerization of lignin-based macromonomers with methyl methacrylate," J. App. Polym. Sci., 1993, 48, 819-831.*
Lebo et al., "Lignin", Kirk-Othmer Encyclopedia of Chemical Technology, vol. 15, pp. 1-32, 2001.
Search Report and Written Opinion from corresponding PCT Application No. PCT/US2012/070917 dated Apr. 2, 2013.
Naveau, Henry P., "Methacrylic Derivatives of Lignin", Cellulose Chemistry and Technology, Editura Academiei Romane, RO, vol. 9, pp. 71-77, Jan. 1, 1975.
Stenlake, J. B. et al., "Biodegradable neuromuscular blocking agents. Part 5 . . . alpha.,.omega.-Bisquaternary polyalkylene phenolic esters", Chimie Therapeutique, Editions Dimeo, Arcueil, FR, vol. 18, No. 3, pp. 273-276, Jan. 1, 1983.
Glasser, W.G., "Cross-Linking Options for Lignins", Adhesives from Renewable Resources, Chapter 4, pp. 43-54, ACS Symposium Series, vol. 385, Dec. 31, 1989.
Liu, C. et al., "Synthesis and Application of Lignin-Based Copolymer LSAA on Controlling Non-Point Source Pollution Resulted from Surface Runoff", Journal of Environmental Sciences, vol. 20, Issue 7, pp. 820-826, 2008.
Lin, X. et al., "Removal of Aniline Using Lignin Grafted Acrylic Acid from Aqueous Solution", Chemical Engineering Journal, vol. 172, Issues 2-3, pp. 856-863, Aug. 15, 2011.
Feng, Q. et al., "Preparation of Thermo-Sensitive Hydrogels from Acrylated Lignin and N-Isopropylacrylamide Through Photocrosslinking", Journal of Biobased Materials and Bioenergy, vol. 6, No. 3, pp. 336-342, Jun. 2012.
Ye, D.Z. et al., "The Graft Polymers from Different Species of Lignin and Acrylic Acid: Synthesis and Mechanism Study", International Journal of Biological Macromolecules, vol. 63, pp. 43-48, Feb. 2014.
Liu, X. et al., "Integration of Lignin and Acrylic Monomers Towards Grafted Copolymers by Free Radical Polymerization", International Journal of Biological Macromolecules, vol. 67, pp. 483-489, Jun. 2014.

* cited by examiner

*Primary Examiner* — Liam J Heincer
*Assistant Examiner* — Nicholas Hill
(74) *Attorney, Agent, or Firm* — Wegman, Hessler & Vanderburg

(57) ABSTRACT

A method for making lignin-amines is provided. The method comprises providing a lignin; then modifying the lignin with modifier to create a modified lignin; and then reacting the modified lignin with an amine to form a lignin-amine. Suitable modifiers comprise acrylates. A method for coagulating suspended materials in a water stream is also disclosed. The method comprises providing a water stream and contacting the suspended materials in the water stream with at least one lignin-amine.

8 Claims, 2 Drawing Sheets

FORMALDEHYDE-FREE LIGNIN-AMINE COAGULANTS

FIELD OF THE INVENTION

The invention pertains to methods and chemical compositions for clarifying aqueous streams.

BACKGROUND OF THE INVENTION

Coagulants are used to clarify industrial waste water having high turbidity. Organic coagulants have received considerable attention as replacement of inorganic coagulants (e.g., aluminum sulfate, polyaluminum chloride and ferric chloride). Although inorganic coagulants are less expensive, they are less efficient and result in a larger volume of sludge which needs further treatment. U.S. Pat. No. 4,155,847 discloses cationic coagulants which are water-soluble polymers made from polycondensation of epihalohydrin and amines. U.S. Pat. Nos. 3,784,493, 3,912,706, 4,017,419, 4,017,475, 4,455, 257, 4,739,040 and 4,775,744 describe the Mannich reaction products of lignin-based materials with amines (including monoamines and polyamines) and can be characterized as in Reaction I:

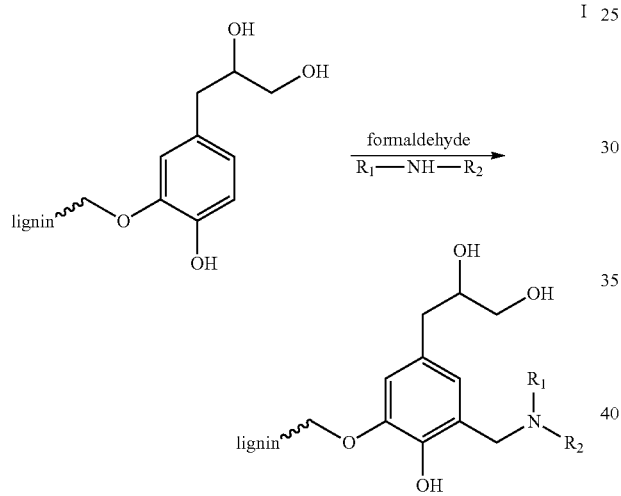

where $R_1$ and $R_2$ may be the same or different and selected from the group consisting of hydrogen, methyls, ethyls, alkyls, hydroxyl-substituted alkyls, and alkoxy-substituted alkyls of 1 to 20 carbon atoms; the alkyl groups may be straight or branched alkyl groups; or a cycloalkyl ring. The lignin may be repeating units of a Kraft lignin or lignosulfonate from softwood or hardwood. The functional groups in the these lignins include, but are not limited to, hydrogen, alkyl groups that are straight or branched, or cycloalkyl rings, for example, phenolic, hydroxyl, methoxyl, carboxyl, catechol, and sulfonate groups. A more thorough technical description of lignins can be found in Lebo, S. E., Gargulak, J. D. and McNally, T. J. 2001. Lignin. *Kirk-Othmer Encyclopedia of Chemical Technology.* John Wiley & Sons.

The resulting cationic lignin-amines are useful as coagulants as well as setting control agents, surfactants, fillers for resins. Formaldehyde, however, was recently identified as a carcinogen. Thus, there is a need for cationic lignin-amine production processes that do not use formaldehyde.

BRIEF DESCRIPTION OF THE INVENTION

A novel approach has been developed for producing lignin-amines. This approach does not involve formaldehyde and is environmentally friendly. In one embodiment, a method for making lignin-amines via Michael addition is disclosed. The method comprises providing a lignin; then reacting the lignin with a modifier to create a modified lignin; and then reacting the modified lignin with an amine to form a lignin-amine. In another embodiment, the modifier comprises an acrylate. In another embodiment, the acrylate comprises methacryloyl or acryloyl chloride. In another embodiment, the amine comprises a primary amine or secondary amine. In yet another embodiment, the amine is selected from the group consisting of piperadine, piperazine, pyrrolidine, morpholine, 1-(2-aminoethyl)piperazine, benzylamine, diethylenetriamine, triethylenetetramine, tetraethylenepentamine, polyethyleneimine, dimethylamine, and diethylamine.

Another embodiment discloses a method for coagulating suspended materials in a water stream. The method comprises providing a water stream and contacting the suspended materials in the water stream with at least one lignin-amine. In another embodiment, the lignin amine used comprises a lignin-diethyl amine.

In another embodiment, the lignin-amine is added to the water stream at from about 1 ppm to about 100 ppm by volume of said water stream. Optionally, the lignin-amine is added at from about 20 ppm to about 60 ppm by volume of the water stream. In yet another embodiment, the lignin-amine is added at from about 20 ppm to about 40 ppm by volume of the water stream.

In another embodiment, a lignin-amine is disclosed having the Formula II or III:

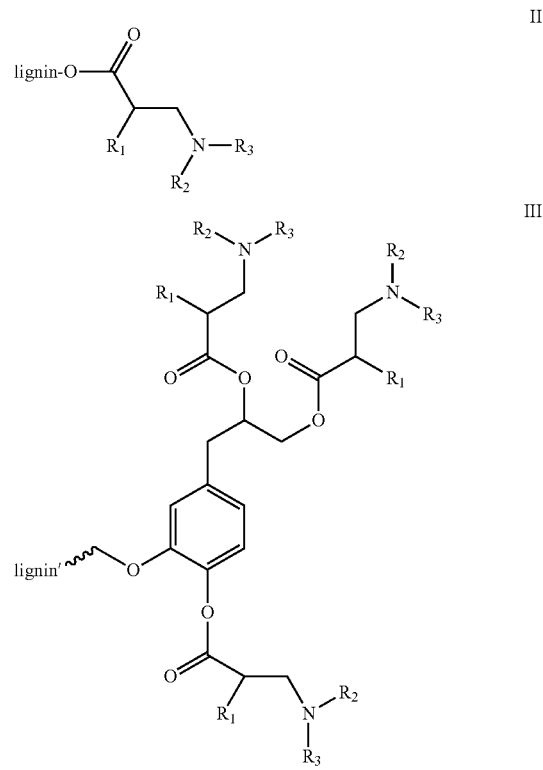

where $R_1$, $R_2$, $R_3$ may be the same or different and selected from the group consisting of hydrogen, methyls, ethyls, alkyls, hydroxyl-substituted alkyls, and alkoxy-substituted alkyls of 1 to 20 carbon atoms; the alkyl groups may be straight or branched alkyl groups; or a cycloalkyl ring.

DETAILED DESCRIPTION OF EXEMPLARY EMBODIMENTS

Figure 1:
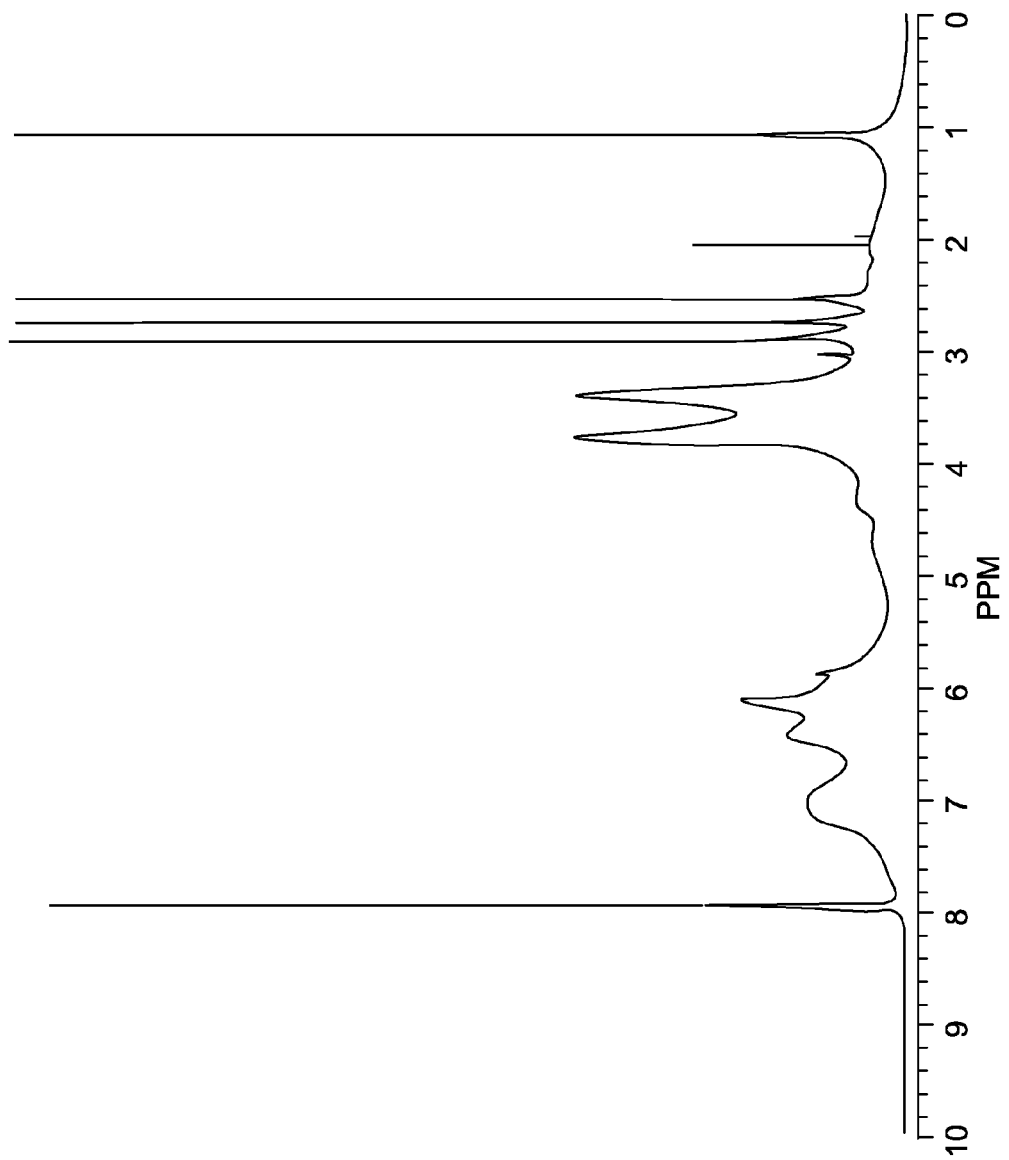
FIG. 1 is a Nuclear Magnetic Resonance graph of Example 1.

Formaldehyde-free cationic lignin-amines have less environmental impact than cationic lignin-amines made with formaldehyde. Formaldehyde-free lignin-amines will meet increasingly stringent discharge regulation. A novel synthetic approach to preparing lignin-amines via Michael addition of acrylate-modified lignin with amines and can be characterized as in Reaction IV:

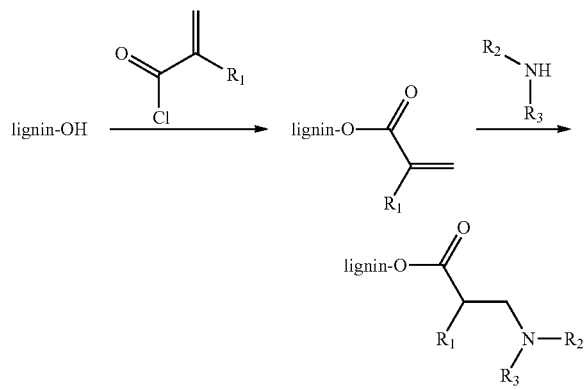

IV where $R_1$, $R_2$, $R_3$ may be the same or different and selected from the group consisting of hydrogen, methyls, ethyls, alkyls, hydroxyl-substituted alkyls, and alkoxy-substituted alkyls of 1 to 20 carbon atoms; the alkyl groups may be straight or branched alkyl groups; or a cycloalkyl ring.

The lignin may be repeating units of a Kraft lignin or lignosulfonate from softwood or hardwood. The functional groups in the these lignins include, but are not limited to, hydrogen, alkyl groups that are straight or branched, or cycloalkyl rings, for example, phenolic, hydroxyl, methoxyl, carboxyl, catechol, and sulfonate groups.

This novel approach does not involve formaldehyde and is environmentally friendly. As shown above, the lignin is modified with a modifier that includes an acyl functional group. Suitable acyl-containing compounds include but are not limited to, methacryloyl and acryloyl chloride. The modified lignin is then reacted with an amine. Both monoamines and polyamines are suitable for Michael addition, including, but not limited to aliphatic primary and secondary amines, cyclic secondary amines, such as piperadine, piperazine, pyrrolidine, morpholine, 1-(2-aminoethyl)piperazine, benzylamine, diethylenetriamine, triethylenetetramine, tetraethylenepentamine, polyethyleneimine, dimethylamine, and diethylamine.

The hydroxide content of the lignin is variable, thus the moles of the modifier used in the reaction may vary based on the measured amount of hydroxide for a particular lignin. In another embodiment, the moles of amine used in the Michael addition are equal to, or slightly greater than, the measured amount of modifying functional groups for a particular modified lignin.

To facilitate the reaction in the modification step, the lignin may be dissolved in a solvent, such as a polar aprotic solvent. Suitable solvents include, but are not limited to, dimethylformamide, tetrahydrofuran, acetone, N-methyl-2-pyrrolidone, pyridine, dimethylsulfoxide, or water. After modification, the modified lignin may then be precipitated out by adding ethanol, water, methanol, or isopropanol.

To facilitate the reaction in the Michael addition step, the modified lignin may be dissolved in a solvent, such as a polar aprotic solvent. Suitable solvents include, but are not limited to, dimethylformamide, tetrahydrofuran, acetone, N-methyl-2-pyrrolidone, dimethylsulfoxide, or methanol.

Alternatively, the reaction may be carried out in water with a phase transfer catalyst (PTC) selected from the group consisting of Formulas V, VI, and VII:

$$(R^4)_4N^+X \qquad\qquad V$$

$$R^5(R)_3Q^+X \qquad\qquad VI$$

$$(R^6)_a(R^7)_{3-a}N-(CH_2)_nN-(R^7)_{3-n}(R^6)(X)(X) \qquad VII$$

where $R^4$ is selected from the same or different $C_{(3-10)}$ alkyl group; $R^5$ is a $C_{(1-3)}$ alkyl group; $R^6$ is selected from the same or different $C_{(1-2)}$ alkyl group; $R^7$ is selected from the same or different $C_{(3-10)}$ alkyl group; Q is a nitrogen or phosphorous atom; X can be a halogen atom, or an —$OR^8$ group where $R^8$ is selected from the group consisting of H, $C_{(1-18)}$ alkyl group, or $C_{(6-18)}$ aryl group; n may be 4 to 6; and a may be 0 to 1.

After Michael addition, the lignin-amine may be precipitated out by adding acetone, or a mixture of acetone and hexane, or diethylether, producing a lignin-diethyl amine. The lignin-diethyl amine is made water soluble by adding a 10 wt % aqueous solution of hydrochloric acid to form a hydrochloride salt. Stability may be improved by adjusting the pH to about 7 or less.

In one embodiment, a method for making lignin-amines via Michael addition is disclosed. The method comprises providing a lignin; then reacting the lignin with an acrylate to create a modified lignin; and then reacting the modified lignin with an amine to form a lignin-amine. In another embodiment, the acrylate comprises methacryloyl or acryloyl chloride. In another embodiment, the amine comprises a primary amine or secondary amine. In yet another embodiment, the amine is selected from the group consisting of piperadine, piperazine, pyrrolidine, morpholine, 1-(2-aminoethyl)piperazine, benzylamine, diethylenetriamine, triethylenetetramine, tetraethylenepentamine, polyethyleneimine, dimethylamine and diethylamine.

Another embodiment discloses a method for coagulating suspended materials in a water stream. The method comprises providing a water stream and contacting the suspended materials in the water stream with at least one lignin-amine. In another embodiment, the lignin amine used comprises a lignin-diethyl amine.

In another embodiment, the lignin-amine is added to the water stream at from about 1 ppm to about 100 ppm by volume of said water stream. Optionally, the lignin-amine is added at from about 20 ppm to about 60 ppm by volume of the water stream. In yet another embodiment, the lignin-amine is added at from about 20 ppm to about 40 ppm by volume of the water stream.

In another embodiment, a lignin-amine is disclosed having the Formula II or III:

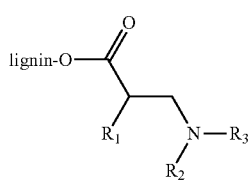

II

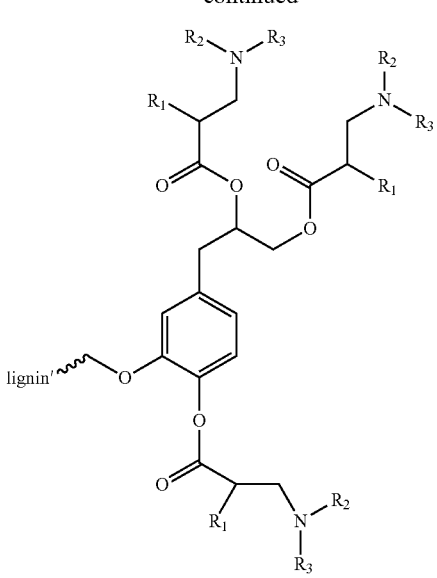

where $R_1$, $R_2$, $R_3$ may be the same or different and selected from the group consisting of hydrogen, methyls, ethyls, alkyls, hydroxyl-substituted alkyls, and alkoxy-substituted alkyls of 1 to 20 carbon atoms; the alkyl groups may be straight or branched alkyl groups or a cycloalkyl ring.

EXAMPLES

Example 1

Kraft lignin, alkali (15 g) was dissolved in 50 ml dimethylformamide (DMF) in a glass flask with a magnetic stirrer. Triethylamine (11.86 mL, 85.0 mmol) was then added into the mixture which was then immersed in an ice-water bath. Acryloyl chloride (6.47 mL, 80.0 mmol) was slowly added into the lignin mixture at 0° C. for about 30 minutes. The reaction mixture was maintained at 0° C. for 1 hour. The reaction mixture was then brought to room temperature overnight. The solution was filtered under vacuum to remove triethylamine salt. The filtrate was placed in 600 mL isopropanol to form yellow precipitates. The yellow precipitates were filtered out and washed with isopropanol several times, yielding about 14.5 g (yield=97%) acrylate-modified lignin.

The acrylate-modified lignin in Example 1 was characterized using nuclear magnetic resonance ($^1$H NMR in d6-DMSO) and is shown in FIG. 1. As can be seen in FIG. 1, the two small peaks at 6.1 and 6.5 ppm correspond to three protons of double bonds in the acrylate groups, indicating that the lignin was modified with acrylate groups.

Example 2

The acrylate-modified lignin (2.0 g) made in Example 1 was mixed with 20 mL dimethyl sulfoxide (DMSO) in a glass flask with a magnetic stirrer. Diethylamine (0.62 mL, 6.0 mmol) was added. The mixture was stirred at 40° C. overnight. The product was precipitated out in diethyl ether, and washed twice with diethyl ether. The resulting dark brown solid was dried under vacuum, yielding about 2.10 g lignin-diethyl amine. Then hydrochloride acid aqueous solution (10 wt %) was slowly added into lignin-diethyl amine aqueous suspension until the lignin solid was fully soluble in water due to the formation of hydrochloride salt. Finally, pH of the solution was tuned to 6 for stock.

Figure 2:
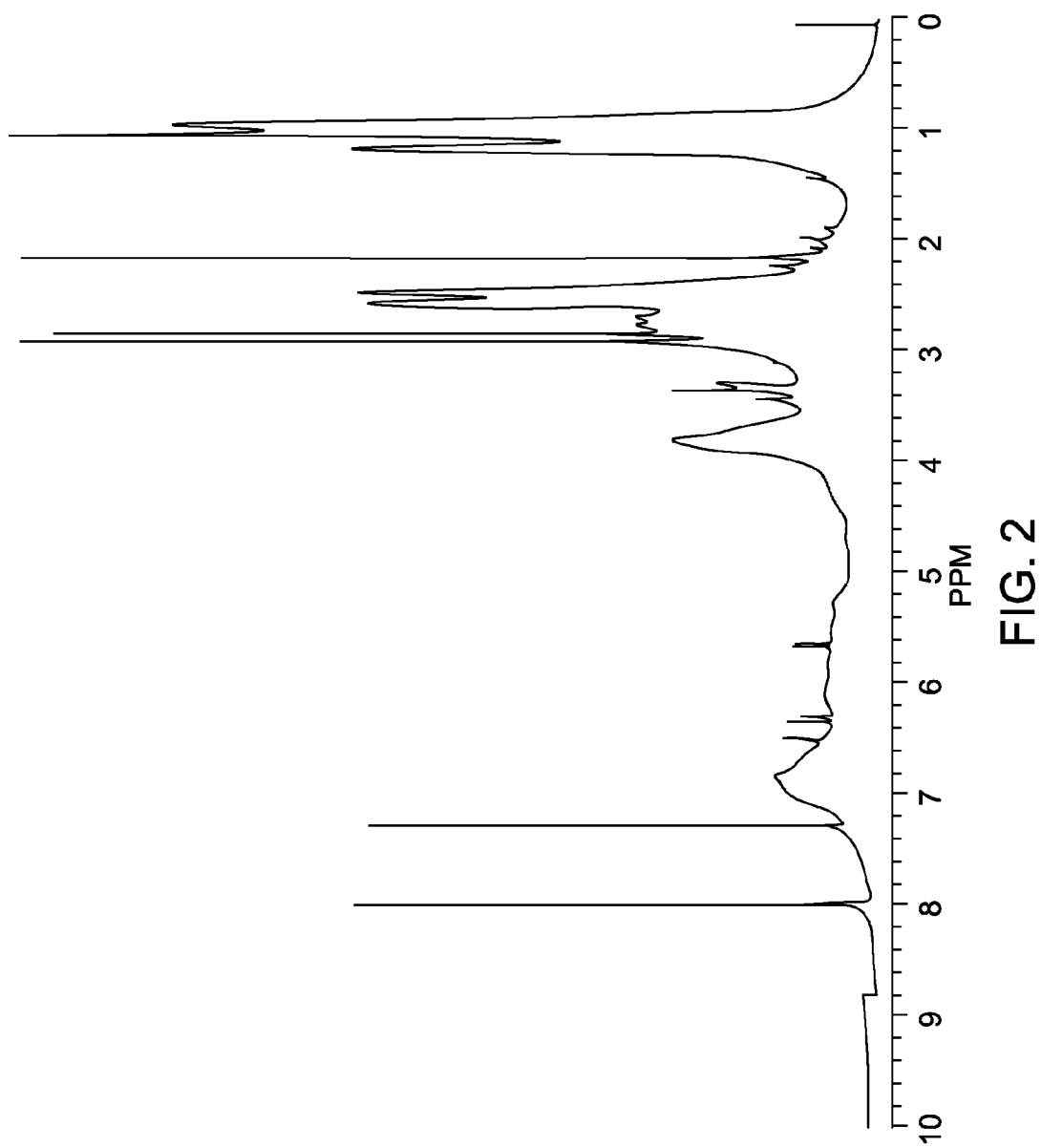
FIG. 2 is a Nuclear Magnetic Resonance graph of Example 2.

The lignin-diethyl amine in Example 2 was characterized using nuclear magnetic resonance ($^1$H NMR in d6-DMSO) and is shown in FIG. 2. As can be seen in FIG. 2, the double bond peaks at 6.1 and 6.5 ppm disappeared, indicating the acrylate groups reacted with amine. The new peaks at 1.0, 2.5, and 2.8 ppm correspond to the protons of alkyl groups in diethyl amine and the ethylene group formed during the Michael addition.

The coagulation efficacy of the lignin-diethyl amine made in Example 2 was tested. A commercial tannin/monoethanolamine/formaldehyde product, PC2700, was used as a benchmark sample to evaluate the performance of the lignin-diethyl amine. Coagulation tests were conducted using synthetic river water which contained distilled water, reagent grade chemicals ($CaCO_3$ and $MgCO_3$), naturally occurring clays, and humic acid. The procedure used was a standard jar test designed to simulate the operation of a typical water treatment clarifier. The test procedure consisted of: adding the treatment to the synthetic river water at various dosages; mixing the treated water at 100 rpm for 30 seconds and at 30 rpm for 5 minutes; and allowing the solids formed in water to settle. The turbidity of the supernatant water produced by each treatment was measured using a nephelometer. The test results are summarized in Table 1.

TABLE 1

| Turbidity testing for cationic lignins (lowest turbidity (NTU) at ppm active dosage) | | | | | | |
|---|---|---|---|---|---|---|
| dosage | 0 ppm | 20 ppm | 30 ppm | 40 ppm | 50 ppm | 60 ppm |
| PC2700 | 80.0 | 29.6 | 2.20 | 1.39 | 2.34 | 6.30 |
| lignin-diethyl amine | 80.0 | 8.51 | 2.06 | 4.41 | | 22.7 |

Based on the performance results summarized in Table 1, lignin-diethyl amine exhibits comparable coagulation performance to PC2700. Especially at 20 ppm, the turbidity of water treated with lignin-diethyl amine is more than 2 times lower than that treated with PC2700, indicating that the novel lignin-amine made by Michael addition is a promising alternative of lignin/formaldehyde/amine condensates.

This written description uses examples to disclose the invention, including the best mode, and also to enable any person skilled in the art to practice the invention, including making and using any devices or systems and performing any incorporated methods. For example, the amount of lignin-amine required to effectively coagulate any given water stream will vary depending on the particular water stream and surrounding conditions or process requirements. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. Coagulant composition comprising a lignin-amine having the formula:

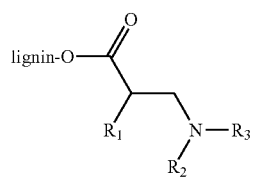

where $R_1$, $R_2$, $R_3$ may be the same or different and selected from the group consisting of hydrogen, methyls, ethyls, alkyls, hydroxyl-substituted alkyls, and alkoxy-substituted alkyls of 1 to 20 carbon atoms; the alkyl groups may be straight or branched alkyl groups or a cycloalkyl ring, whereby said composition, when added to a water stream, coagulates suspended particles therein.

2. Coagulant composition comprising a lignin-amine having the formula:

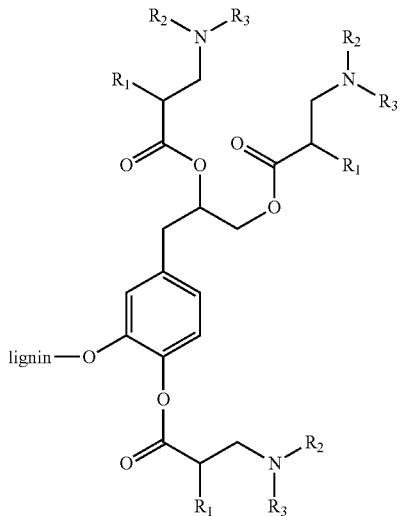

where $R_1$, $R_2$, $R_3$ may be the same or different and selected from the group consisting of hydrogen, methyls, ethyls, alkyls, hydroxyl-substituted alkyls, and alkoxy-substituted alkyls of 1 to 20 carbon atoms; the alkyl groups may be straight or branched alkyl groups or a cycloalkyl ring, whereby said composition when added to a water stream coagulates suspended particles therein.

3. Coagulant composition as recited in claim 1 wherein said composition is water soluble.

4. Coagulant composition as recited in claim 3 wherein said composition is present in an aqueous solution including a salt.

5. Coagulant composition as recited in claim 4 wherein said salt is a hydrochloride salt.

6. Coagulant composition as recited in claim 4 wherein said aqueous solution has a pH of about 7 or less.

7. Coagulant composition as recited in claim 1 wherein $R_1$=H and $R_2$ and $R_3$ are both ethyl.

8. Coagulant composition as recited in claim 1 wherein said composition is devoid of formaldehyde.

* * * * *